United States Patent
Bybell et al.

(10) Patent No.: US 8,782,380 B2
(45) Date of Patent: Jul. 15, 2014

(54) FINE-GRAINED PRIVILEGE ESCALATION

(75) Inventors: Anthony J. Bybell, Chapel Hill, NC (US); Anup Wadia, Wake Forest, NC (US)

(73) Assignee: International Business Machines Corporation, Armonk, NY (US)

( * ) Notice: Subject to any disclaimer, the term of this patent is extended or adjusted under 35 U.S.C. 154(b) by 622 days.

(21) Appl. No.: 12/967,085

(22) Filed: Dec. 14, 2010

(65) Prior Publication Data

US 2012/0151185 A1    Jun. 14, 2012

(51) Int. Cl.
*G06F 9/30* (2006.01)

(52) U.S. Cl.
USPC .......................................... 712/229; 712/224

(58) Field of Classification Search
USPC .................................... 712/43, 205, 224, 229
See application file for complete search history.

(56) References Cited

U.S. PATENT DOCUMENTS

| | | | |
|---|---|---|---|
| 4,809,160 A * | 2/1989 | Mahon et al. | 726/4 |
| 5,890,189 A * | 3/1999 | Nozue et al. | 711/100 |
| 6,393,556 B1 | 5/2002 | Arora | |
| 6,631,472 B2 * | 10/2003 | Kaplan et al. | 713/166 |
| 7,669,050 B2 | 2/2010 | Blinick et al. | |
| 7,680,999 B1 | 3/2010 | Morris et al. | |
| 7,984,304 B1 * | 7/2011 | Waldspurger et al. | 713/187 |
| 2006/0184777 A1 * | 8/2006 | Mericas | 712/227 |
| 2007/0226471 A1 * | 9/2007 | Kapustin et al. | 712/227 |
| 2008/0065868 A1 * | 3/2008 | Banerjee et al. | 712/226 |
| 2008/0155274 A1 * | 6/2008 | Martinez et al. | 713/190 |
| 2008/0222397 A1 * | 9/2008 | Wilkerson et al. | 712/220 |

* cited by examiner

*Primary Examiner* — Robert Fennema
*Assistant Examiner* — Yuqing Xiao
(74) *Attorney, Agent, or Firm* — Katherine S. Brown; Jeffrey L. Streets

(57) ABSTRACT

A processor and a method for privilege escalation in a processor are provided. The method may comprise fetching an instruction from a fetch address, where the instruction requires the processor to be in supervisor mode for execution, and determining whether the fetch address is within a predetermined address range. The instruction is filtered through an instruction mask and then it is determined whether the instruction, after being filtered through the mask, equals the value in an instruction value compare register. The processor privilege is raised to supervisor mode for execution of the instruction in response to the fetch address being within the predetermined address range and the filtered instruction equaling the value in the instruction value compare register, wherein the processor privilege is raised to supervisor mode without use of an interrupt. The processor privilege returns to its previous level after execution of the instruction.

17 Claims, 5 Drawing Sheets

FINE-GRAINED PRIVILEGE ESCALATION

BACKGROUND

1. Field of the Invention

The present invention relates to computer processors and, more particularly, to changing privilege levels for the execution of instructions in a computer processor.

2. Background of the Related Art

Computer systems are designed around an integrated circuit, known as a "processor," that executes programmed instructions stored in the system's memory. The processor reads instructions from memory and feeds them into one end of the pipeline. The pipeline is made of several stages, each stage performing some function necessary or desirable to process instructions before passing the instruction to the next stage. For instance, the first stage might fetch the instruction, the next stage might decode the fetched instruction, and the next stage might execute the decoded instruction. Each stage of the pipeline typically moves the instruction closer to completion.

In order to affect security features and provide multi-user capability in processors, including pipelined processors, operating system software needs to prevent the user from performing certain operations. For example, operating system instructions may be assigned one privilege level, while application program instructions may be assigned a lower privilege level. Thus, the operating system instruction would have access to some system resources that the application program instructions would not be able to access. Privilege levels can sometimes be dynamic in the sense that they can occasionally change. To accomplish this, the operating system software assigns a privilege level to the processor. A "current privilege level" (CPL) for the processor is normally maintained in the processor's architectural register set.

A program or process may request a service from the kernel of an operating system, which service the program normally does not have permission to run, by issuing a system call. System calls provide the interface between a process and the operating system. Most operations interacting with the system require permissions that are not available to a user level process, such as I/O performed with a device present on the system, or any form of communication with other processes requires the use of system calls.

The design of the microprocessor architecture on practically all modern systems (except some embedded systems) offers a series of CPU modes. Applications normally execute in a low privilege level that limits the address space of the program so that it cannot access or modify other running applications or the operating system itself. This low privilege level also prevents the application from directly using certain devices, such as the frame buffer or network devices. However, since many normal applications need these abilities, the operating system provides pre-defined system calls to the applications. The operating system executes at the highest level of privilege, and allows applications to request services via system calls, which are often implemented through the use of interrupts. If allowed, the system enters a higher privilege level, executes a specific set of instructions over which the interrupting program has no direct control, returns to the calling application's privilege level, and then returns control to the calling application.

A CPU mode, which may also be referred to as a processor mode, CPU state, and CPU privilege level, is an operating mode for the central processing unit (CPU) of some computer architectures that place restrictions on the type and scope of operations that can be performed by certain processes being run by the CPU. Ideally, only highly-trusted kernel code is allowed to execute in an unrestricted mode. All other processes, including non-supervisory portions of the operating system, must run in a restricted mode and use a system call to request that the kernel perform, on behalf of the process, any operation that could damage or compromise the system. This makes it impossible for an untrusted program to alter or damage other programs or the computing system itself.

At a minimum, any CPU architecture supporting protected execution will offer two distinct operating modes; at least one of the modes must allow completely unrestricted operation of the processor. The unrestricted mode is often called kernel mode, but may also be referred to as master mode, supervisor mode, privileged mode, or supervisor state. A restricted mode is usually referred to as a user mode, but may also be referred to as slave mode, user mode, or problem state.

In kernel mode, the CPU may perform any operation allowed by its architecture; any instruction may be executed, any I/O operation initiated, any area of memory accessed, and so on. In the other CPU modes, certain restrictions on CPU operations are enforced by the hardware. Typically, certain instructions are not permitted, such as I/O operations that could alter the global state of the machine or access some restricted memory areas. User-mode capabilities of the CPU are typically a subset of those available in kernel mode but in some cases, such as hardware emulation of non-native architectures, they may be significantly different from those available in standard kernel mode.

Some CPU architectures support multiple user modes, often with a hierarchy of privileges. These architectures are often said to have ring-based security, wherein the hierarchy of privileges resembles a set of concentric rings, with the kernel mode in the center.

BRIEF SUMMARY

One embodiment of the present invention provides a method comprising fetching an instruction from a fetch address, where the instruction requires the processor to be in supervisor mode for execution, and determining whether the fetch address is within a predetermined address range. The instruction is filtered through an instruction mask and then it is determined whether the instruction, after being filtered through the mask, equals the value in an instruction value compare register. The processor privilege is raised to supervisor mode for execution of the instruction in response to the fetch address being within the predetermined address range and the filtered instruction equaling the value in the instruction value compare register, wherein the processor privilege is raised to supervisor mode without use of an interrupt. The processor privilege returns to its previous level after execution of the instruction.

Another embodiment of the invention provides a processor comprising a fetch module having a lower address register and an upper address register, a first comparison circuit to determine that a fetch address is greater than the content of the lower address register, a second comparison circuit to determine that a fetch address is less than the content of the upper address register, and a first AND gate having a first input coupled to the output of the first comparison circuit and a second input coupled to the output of the second comparison circuit. The processor further comprises an instruction mask register containing a mask, and a bitwise logical AND circuit having a first input receiving an instruction from the fetch address and a second input receiving the mask. Still further, the processor comprises an instruction value compare register, and a third comparison circuit to determine whether the value in the value compare register equals the instruction after being filtered through the mask. The processor also comprises a second AND gate having a first input coupled to the first AND gate, a second input coupled to the output of the third comparison circuit, and an output that, if true, raises the privilege of the processor for execution of the instruction.

DETAILED DESCRIPTION

Figure 1:
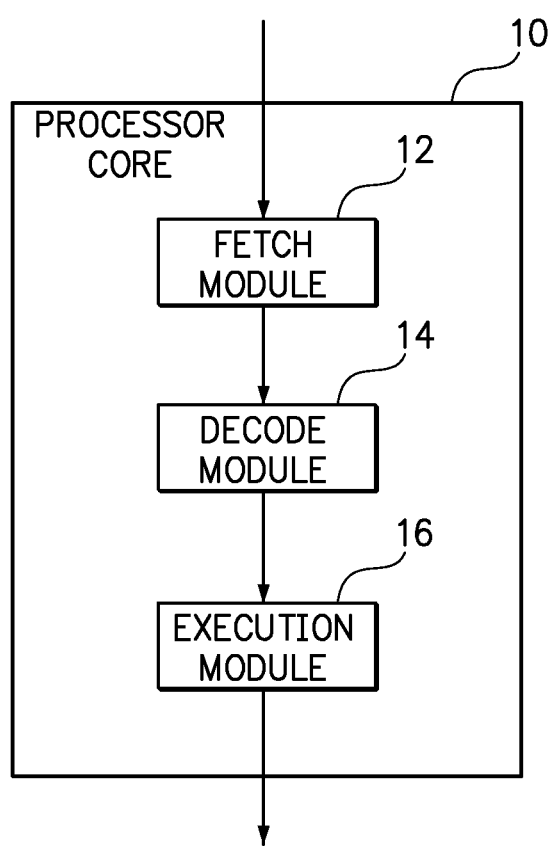
FIG. 1 is a diagram of a processor having a fetch module, decode module, and execution module.

One embodiment of the present invention provides a method comprising fetching an instruction from a fetch address, where the instruction requires the processor to be in supervisor mode for execution, and determining whether the fetch address is within a predetermined address range. The instruction is filtered through an instruction mask and then it is determined whether the instruction, after being filtered through the mask, equals the value in an instruction value compare register. The processor privilege is raised to supervisor mode for execution of the instruction in response to the fetch address being within the predetermined address range and the instruction, after being filtered through the mask, equaling the value in the instruction value compare register, wherein the processor privilege is raised to supervisor mode without use of an interrupt. The processor privilege returns to its previous level after execution of the instruction. The method may be used to allow certain instructions in a certain portion of a user mode program to be granted privilege escalation with an interrupt or system call.

Optionally, determining that the fetch address is within a predetermined address range, may include comparing the fetch address against a value in a lower range register to form a first logical output, comparing fetch address against a value in an upper range register to form a second logical output, and performing a logical AND on the first and second logical outputs. The nature of the comparisons may vary, but the purpose of the comparisons is to determine whether the fetch address is within the predetermined address range. It should be recognized that the fetch address should be greater than (or greater than or equal to) a first address value stored in the lower address register, and should also be less than (or less than or equal to) a second address value stored in the upper address register. Most preferably, the value in the lower range register and the value in the upper range register are stored by a separate supervisor mode process.

In a separate option, filtering the instruction through an instruction mask includes performing a bitwise logical AND with a first input from the instruction and a second input from the instruction mask register. The output of the bitwise logical AND circuit is a binary string that forms an input to an instruction value comparison circuit. Most preferably, the value in the instruction mask register is stored by a separate supervisor mode process.

A bitwise comparison may be used in determining whether the instruction, after being filtered through the mask, equals the value in an instruction value compare register. The content of the instruction value compare register may include a predetermined instruction or opcode for which it is intended to grant privilege escalation to the supervisor mode. Furthermore, it is preferred that the value in the instruction mask register is stored by a separate supervisor mode process.

Another embodiment of the invention provides a processor comprising a fetch module having a lower address register and an upper address register, a first comparison circuit to determine that a fetch address is greater than the content of the lower address register, a second comparison circuit to determine that a fetch address is less than the content of the upper address register, and a first AND gate having a first input coupled to the output of the first comparison circuit and a second input coupled to the output of the second comparison circuit. The processor further comprises an instruction mask register containing a mask, and a bitwise logical AND circuit having a first input receiving an instruction from the fetch address and a second input receiving the mask. Still further, the processor comprises an instruction value compare register, and a third comparison circuit to determine whether the value in the value compare register equals the instruction after being filtered through the mask. The processor also comprises a second AND gate having a first input coupled to an output of the first AND gate, a second input coupled to an output of the third comparison circuit, and an output that, if true, raises the privilege of the processor for execution of the instruction. Preferably, the processor privilege is automatically reduced for a subsequent instruction unless the output of the second AND gate is again true. Optionally, the processor is a central processing unit (CPU).

The processor may comprise a plurality of parallel circuits as described above. Accordingly, it is possible for the processor to raise the privilege of several substantially unrelated instructions, whether they are unrelated by being located in different address ranges or unrelated by using different combinations of an instruction mask and instruction value compare. Preferably, the output of the parallel circuits feeds into an OR gate, where the output of the OR gate is the signal that raised the privilege.

The foregoing methods and structures are not limited to use in any one type of processor or the manner in which the raised privilege is implemented by a processor. It should be recognized that methods and structures may be implemented in various manners. For example, in a processor where the privilege level follows an instruction down the pipeline, either physically/directly or through use of a manager, the "true" output of the second AND gate may cause substitution of the raised privilege level for a current privilege level. The raised privilege level will then follow the instruction in the same manner as any other privilege level. In a processor design where the privilege level is stored in something like a current privilege level (CPL) register, there are many ways to raise the privilege. In one non-limiting example, there is a fetcher flush at the point of the instruction which needs its privilege raised; the current CPL is stored in a temporary internal (to the processor) storage location such as a private register; the CPL is raised; the instruction is re-issued; there is a fetcher flush on the next instruction; the CPL is restored from the temporary register; and Fetching/Decoding/Execution proceeds as normal.

EXAMPLE 1

In the following non-limiting example, it is assumed that a user mode application subroutine resides in memory from 0x1700 to 0x17CF inclusive, and that this subroutine needs write access to the decrementer register on a PowerPC machine. The decrementer register is the special purpose register number 22 ("spr22"), which is hexadecimal 0x016. In order to write a value from one of thirty-two (32) general purpose registers (G0 to G31) into the decrementer, the subroutine will include the instruction "mtspr 0x016, G0", where "mtspr" means "move to special purpose register", 0x016 is the address of the special purpose register, and G0 is the first general purpose register (which may similarly be substituted with any of the other available general purpose registers, G1 to G31). However, these instructions will only execute if the processor is in supervisor mode.

To set up the processor so that it will automatically allow the subroutine to have write access to the decrementer register as described above, a process in supervisor mode will set the lower and upper address registers in the processor to 0x1700 and 0x17D0, respectively; set the instruction mask register to 0xFC1FFFFF; and set the instruction value compare register to 0x7C1603A6. These registers can only be set in supervisor mode.

For each instruction, a corresponding fetch address is compared against the lower address register and compared against the upper address register. If the fetch address is greater than the value 0x1700 in the lower address register and also less than the value 0x17D0 in the upper address register, then the instruction is determined to be part of the subroutine that is eligible for privilege escalation. However, the instruction must meet additional criteria before privilege escalation will occur.

The value of 0xFC1FFFFF in the instruction mask register allows a general purpose register in the range of G0 to G31 to be used as the source for a value to be written into the decrementer. The binary equivalent of 0xFC1FFFFF (hexadecimal) is 11111100000111111111111111111111 (i.e., 32 bits numbered 0-31 from left to right). By performing a bitwise logical AND with this instruction mask and an instruction like <opcode (bits 0-5), address1 (bits 6-10), address2 (bits 11-20), value (bits 21-31)>, all of the bits in the instruction are passed except for address1 (the five bits from bit 6-10). In this example, address1 is the address of a general purpose register. Accordingly, the exact general purpose register is ignored for the purpose of the subsequent instruction comparison.

The value 0x7C1603A6 in the instruction value compare register corresponds to an instruction of "mtspr 0x016, G0" in the PowerPC instruction set architecture. This instruction is necessary to move value from the source (i.e., one of the general purpose registers G0 to G31) into the decrementer.

If the instruction has a fetch address between 0x1700 and 0x17D0, then the value of 0xFC1FFFFF in the instruction mask register and the value 0x7C1603A6 in the instruction value compare register, will grant supervisor mode to instructions 7C1603A6, 7C3603A6, 7C5603A6, . . . , 7FF603A6. These instructions correspond to "mtspr 0x016, G0" through "mtspr 0x016, G31". In other words, during execution of the subroutine, any code between 0x1700 through 0x17CF inclusive with opcodes which match the values 7C1603A6, 7C3603A6, 7C5603A6, . . . , 7FF603A6 cause the processor to jump into privilege mode for those specific instructions. The processor privilege mode reverts back to its previous state after instruction execution, unless the subsequent instruction also matches. In the latter case, the subsequent instruction is also allowed to execute in supervisor mode. Therefore, a user-mode program is permitted to execute one or more supervisor mode instructions without taking the performance hit of jumping into and out of supervisor mode via an interrupt.

EXAMPLE 2

The values in the instruction mask register and the instruction value compare register may optionally be set to escalate the privilege of one and only one instruction. To implement escalated privilege for the desired instruction, the instruction mask register may be set to a mask value of 0xFFFFFFFF and the instruction value compare register should be set to the value of the desired instruction. Accordingly, the mask lets all the bits in the instruction pass through the filter and only the desired instruction will matched the value in the instruction value compare register. Any instruction in the instruction set for a particular processor may be used in this manner.

EXAMPLE 3

In accordance with Example 1, if the instruction mask register was set to all '0' bits (i.e., "00000000") and the instruction value compare register was set to all '1' bits (i.e., "FFFFFFFF"), then the there are no possible instructions for which the privilege will be raised.

EXAMPLE 4

In accordance with Example 1, if the instruction mask register was set to all '0' bits (i.e., "00000000") and the instruction value compare register was set to all "0' bits (i.e., "00000000"), then all possible instructions in the address range will be granted privilege escalation. These register values could be used for trusted subroutine code in high-performance applications.

FIG. 1 is a diagram of a processor core 10 having a fetch module 12, decode module 14, and execution module 16. It should be recognized that these modules may not be discrete elements, but characterizations of portions of the processor core. Various interactions or connections that may exist between the modules are generalized in this Figure.

Figure 2:
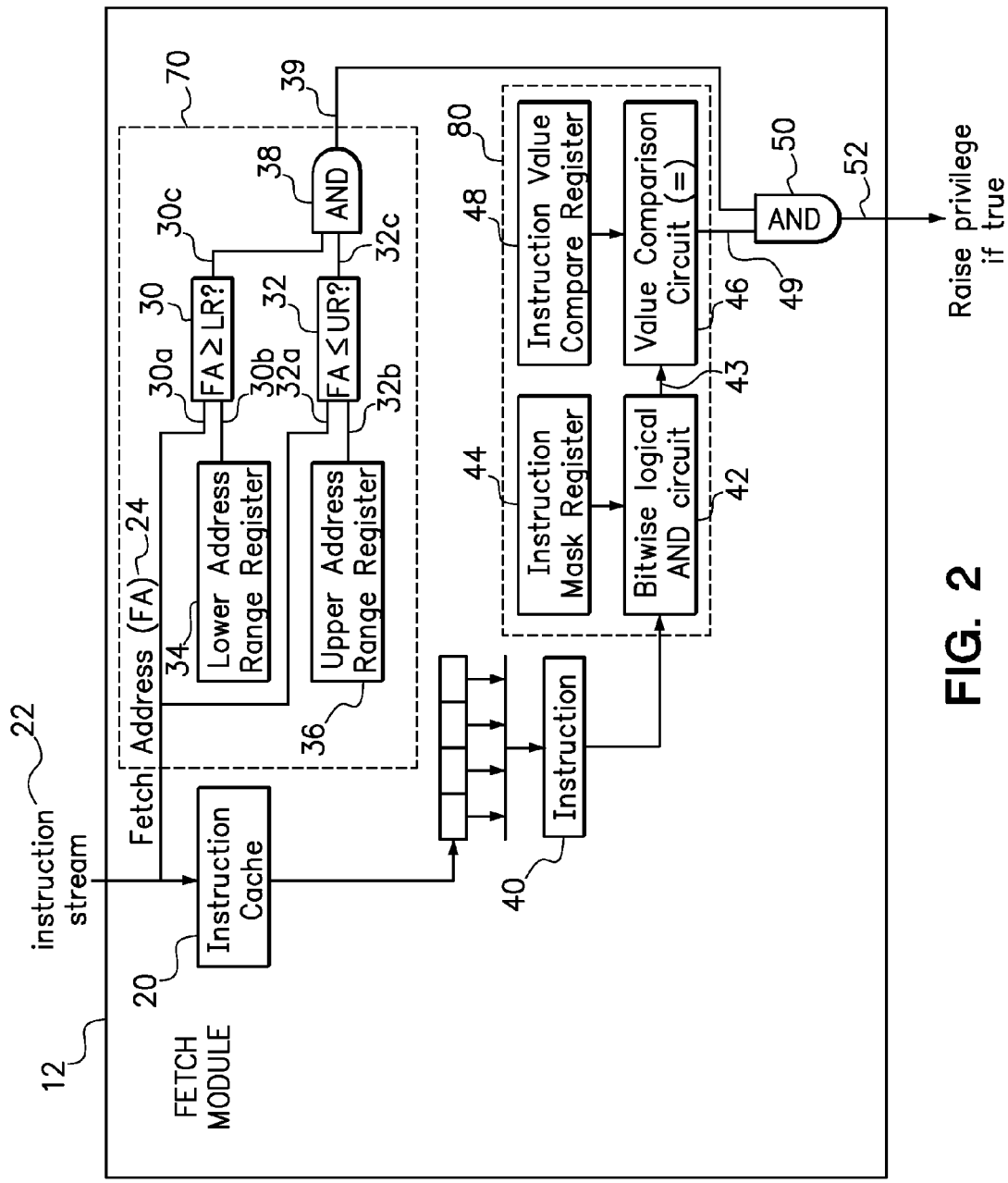
FIG. 2 is a diagram of a fetch module.

FIG. 2 is a diagram of a fetch module 12 including an instruction cache 20 that receives an instruction stream 22. A fetch address 24 is read from each instruction of the stream and provided to a first input 30*a* to a first comparator circuit 30 and a first input 32*a* of a second comparator circuit 32.

A lower address range register 34 stores an address value that sets the lower end of an address range that is eligible for privilege escalation in accordance with the invention. The value in the lower address range register 34 is provided to a second input 30*b* of the first comparator circuit 30. The first comparator circuit 30 then determines whether the fetch address 24 is greater than or equal to the value in the lower address range register 34, and provides an output 30*c* that is true in response to a positive determination.

Similarly, an upper address range register 36 stores an address value that sets the upper end of an address range that is eligible for privilege escalation in accordance with the invention. The value in the upper address range register 36 is provided to a second input 32*b* of the second comparator circuit 32. The second comparator circuit 32 then determines whether the fetch address 24 is less than or equal to the value in the upper address range register 36, and provides an output 32*c* that is true in response to a positive determination.

The output 30*c* of the first comparator circuit 30 and the output 32*c* of the second comparator circuit 32 are provided to first and second inputs of an AND gate 38. An output 39 of the AND gate 38 is provided for further use in determining whether to provide privilege escalation for the current instruction. When the output 39 is true, this means that the fetch address 24 is within the range of code that is intended to be eligible for privilege escalation. The combination of many of the foregoing elements is circled by a dashed line in FIG. 2 and may be described as an address range circuit 70.

An instruction 40, which was obtained from memory at the fetch address 24, is obtained directly from the instruction stream 22 or from the instruction cache 20. The instruction 40 is input to a first input to a bitwise logical AND circuit 42. A second input to the bitwise logical AND circuit 42 receives an instruction mask value from an instruction mask register 44. The output 43 from the bitwise logical AND circuit 42 is a binary instruction that is provided to a first input to an instruction value compare circuit 46. A second input to the instruction value compare circuit 46 receives an instruction value from an instruction value compare register 48. If the instruction value compare circuit 46 determines that the instruction from output 43 and the instruction value from the instruction value compare register 48 are equal, then the output 49 of the circuit 46 is true. When the output 49 is true, this means that the instruction 40 is eligible for privilege escalation. The foregoing combination of elements is circled by another dashed line in FIG. 2 and may be described as an instruction mask/value comparison circuit 80.

The output 39 from the first AND gate 38, and the output 49 from the value comparison circuit 46 are provided to the first and second inputs to a second AND gate 50. If both of the inputs 39, 49 to the second AND gate 50 are true, then the output 52 of the second AND gate 50 is true. When the output 52 of the gate 50 is true, then the processor will raise the privilege of the processor for the limited purpose of execution the current instruction.

Figure 3:
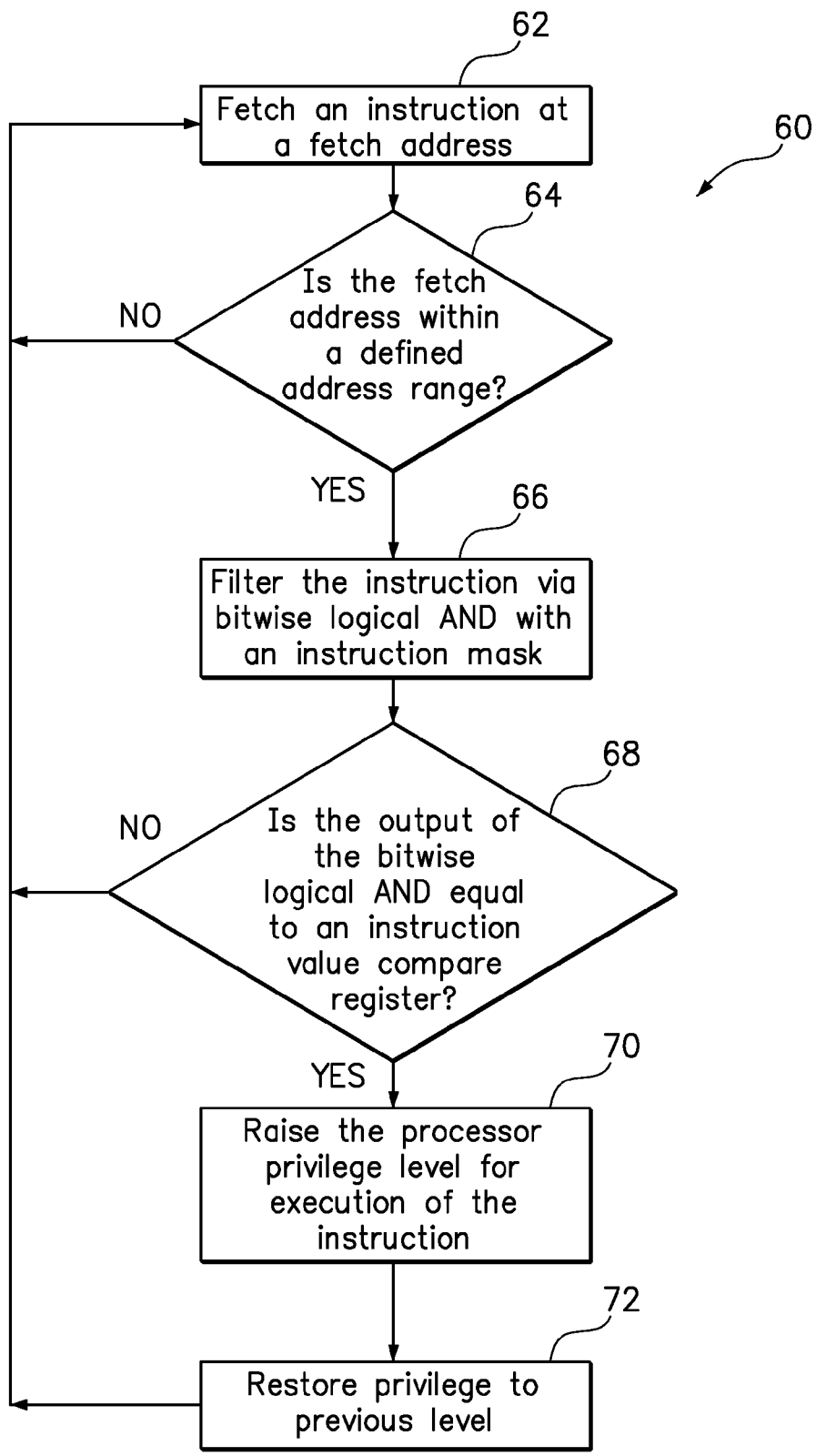
FIG. 3 is a flowchart of a method of privilege escalation.

FIG. 3 is a flowchart of one example of a method 60 of privilege escalation. In step 62, the method fetches an instruction at a fetch address. If step 64 determines that the fetch address is not within a defined address range, then the process returns to step 62. However, if the fetch address is within the defined address range, the process advances to step 66 where the instruction is filtered via a bitwise logical AND with an instruction mask.

If step 68 determines that the output of the bitwise logical AND is not equal to the value in the instruction value compare register, then the process returns to step 62. However, if step 68 determines that the instruction and the instruction value in the instruction value compare register are equal, then the process advances to step 70 to raise the processor privilege level for execution of the instruction. In step 72, the processor privilege level is restored to its previous level.

Figure 4:
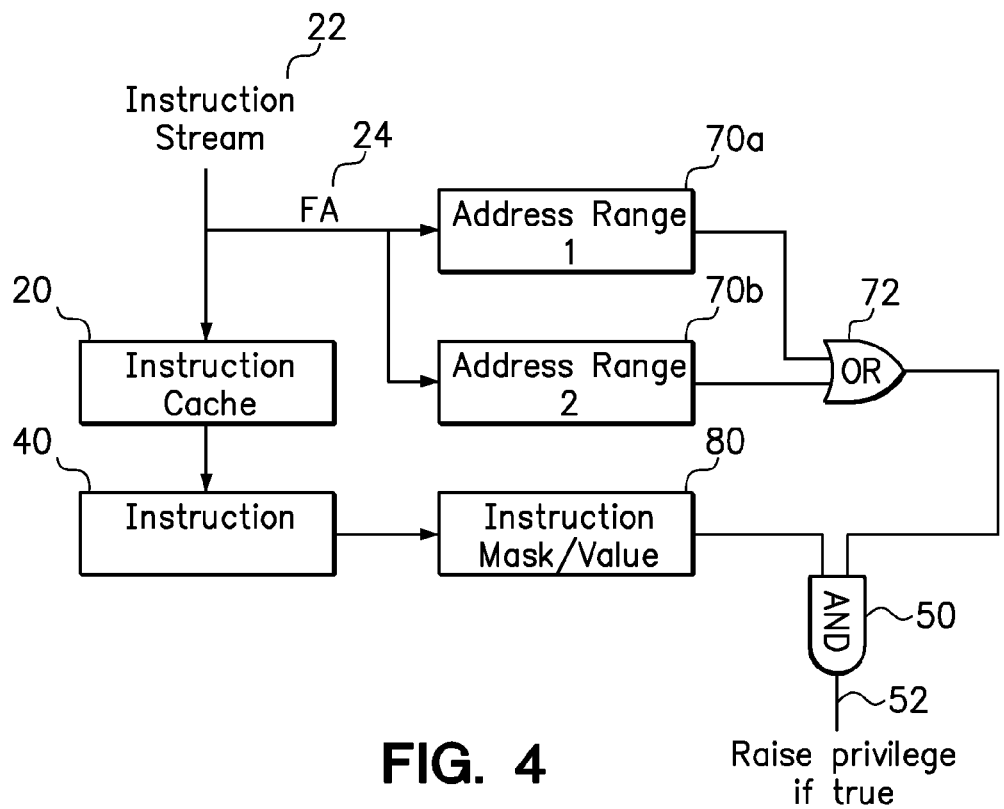
FIG. 4 is a diagram of a fetch module including two address range circuits.

FIG. 4 is a diagram of a fetch module including two address range circuits 70a, 70b. The output of the two address range circuits is input to an OR gate 72, and the output of the OR gate is input to the AND gate 50. Accordingly, code from either of two address ranges is eligible for privilege escalation. Code must be from one of these two ranges and the instruction must match the criteria in the instruction mask/value comparison circuit 80, before the output 52 will be "true" and the privilege will be raised.

Figure 5:
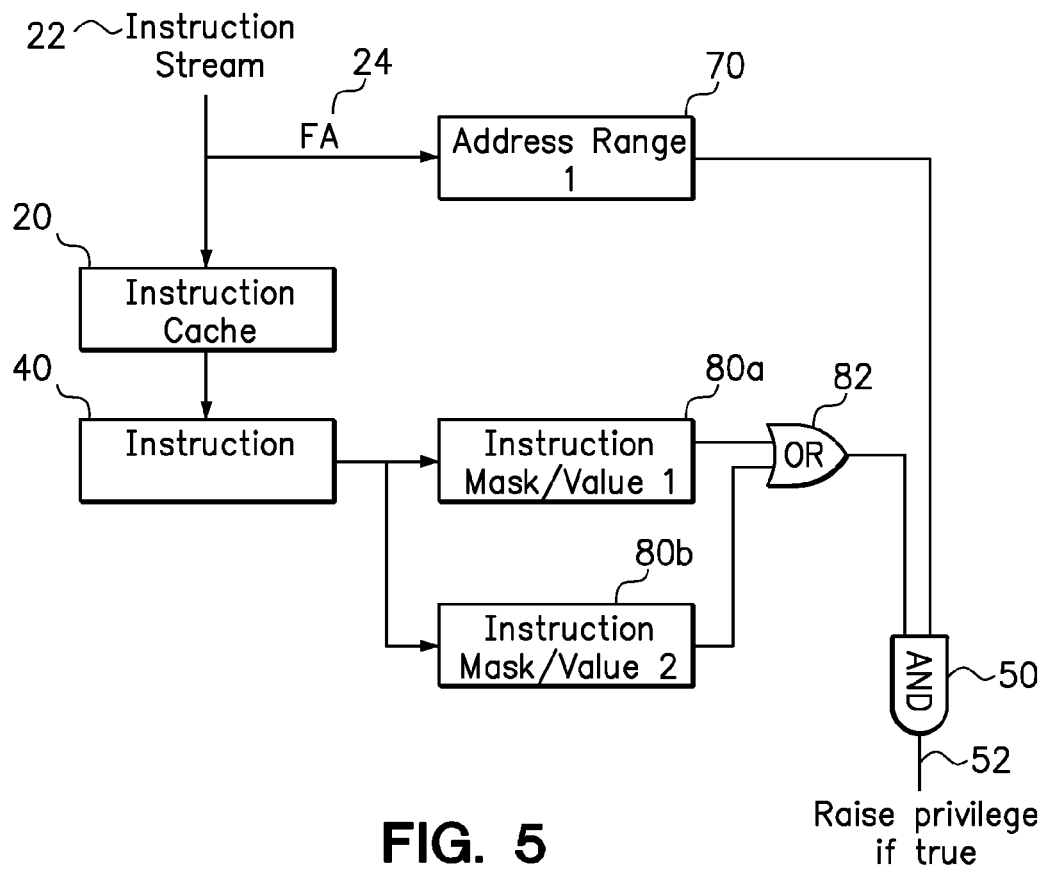
FIG. 5 is a diagram of a fetch module including two instruction mask/value comparison circuits.

FIG. 5 is a diagram of a fetch module including two instruction mask/value comparison circuits 80a and 80b. The output of the two instruction mask/value comparison circuits is input to an OR gate 82, and the output of the OR gate is input to the AND gate 50. Accordingly, an instruction that satisfied either instruction mask/value comparison circuit is eligible for privilege escalation. Code must be from the address range of circuit 70 and the instruction must match the criteria of one of the two instruction mask/value comparison circuits 80a, 80b, before the output 52 will be "true" and the privilege will be raised.

Figure 6:
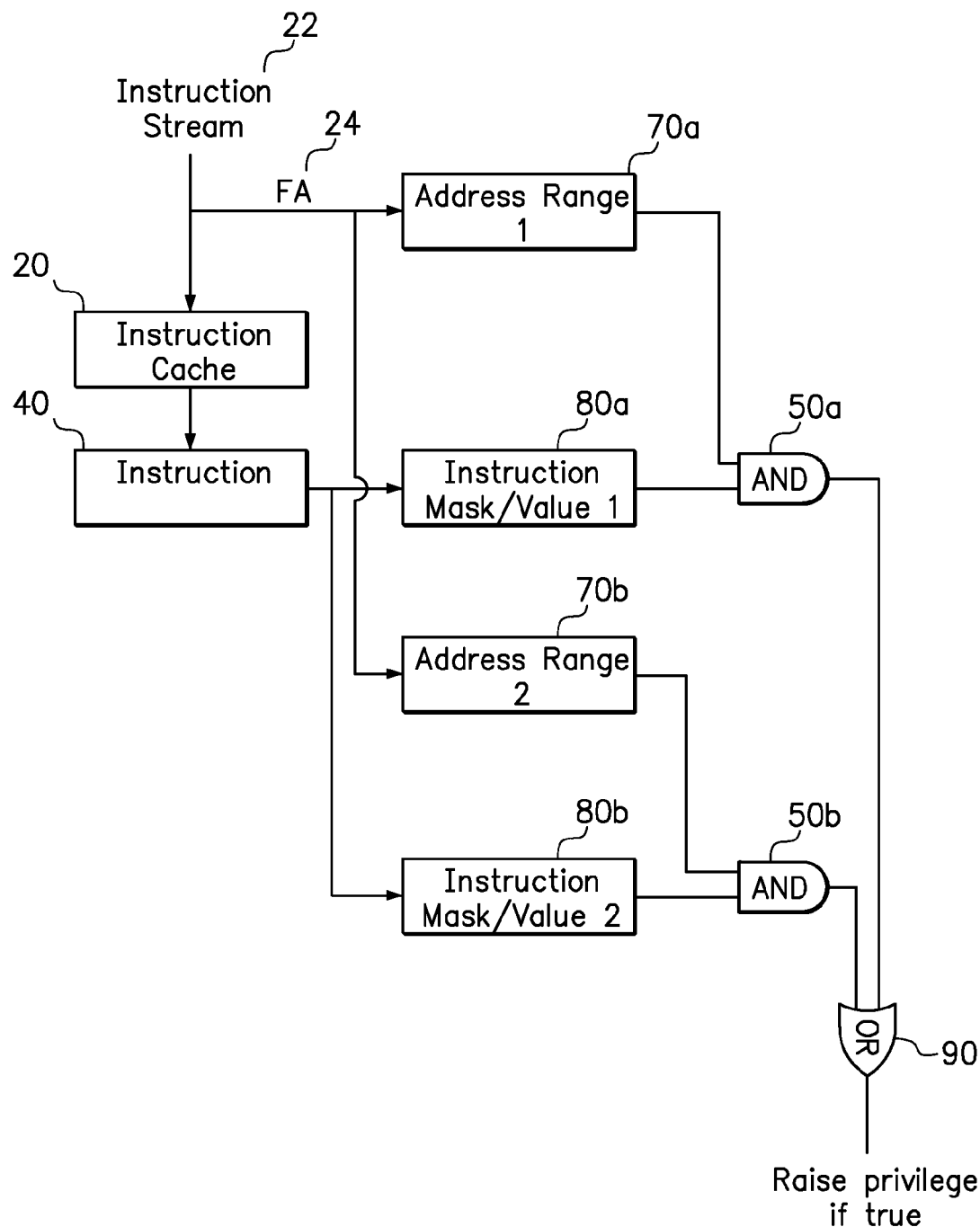
FIG. 6 is a diagram of a fetch module including two parallel circuits, where each circuit includes an address range circuit and an instruction mask/value comparison circuit.

FIG. 6 is a diagram of a fetch module including two parallel circuits, where each circuit includes an address range circuit and an instruction mask/value comparison circuit. The output of a first address range circuit 70a and the output of a first instruction mask/value comparison circuit 80a are input to an AND gate 50a, in the same manner as described in reference to FIG. 2. Similarly, the output of a second address range circuit 70b and the output of a second instruction mask/value comparison circuit 80b are input to an AND gate 50b, in the same manner as described in reference to FIG. 2. However, the output of AND gate 50a and the output of AND gate 50b are input to an OR gate 90. Accordingly, if either of the AND gates 50a, 50b has an output that is "true", then the output of the OR gate 90 will be "true" and the privilege will be raised. It should be recognized that the circuit in FIG. 6 allows privilege escalation with respect to two independent instruction types from two separate code address ranges. Circuits for implementing privilege escalation for additional instruction types and/or ranges should be apparent given the teachings of the present application.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for raising the privilege level in a processor, comprising:
    determining whether a fetch address is within a predetermined address range;
    filtering an instruction from the fetch address by a bitwise logical AND with an instruction mask;
    determining whether the instruction, after being filtered through the instruction mask, equals a predetermined instruction; and
    raising the processor privilege to supervisor mode for execution of the instruction in response to the fetch address being within the predetermined address range and the filtered instruction equaling the predetermined instruction;
    wherein the predetermined instruction is stored in an instruction value compare register and the instruction mask is stored in an instruction mask register, and wherein the content of the instruction value compare register and the content of the instruction mask register may be set only in supervisor mode.

2. The method of claim 1, wherein the instruction mask is stored in an instruction mask register.

3. The method of claim 1, wherein determining that the fetch address is within a predetermined address range, includes comparing the fetch address against a value in a lower range register to form a first logical output, comparing fetch address against a value in an upper range register to form a second logical output, and performing a logical AND on the first and second logical outputs.

4. The method of claim 3, wherein the value in the lower range register and the value in the upper range register are stored by a supervisor mode function prior to fetching the instruction.

5. The method of claim 1, wherein the processor privilege is raised to supervisor mode without use of an interrupt.

6. The method of claim 1, further comprising:
    returning the processor privilege to its previous level after execution of the instruction.

7. The method of claim 1, further comprising:
    fetching the instruction from the fetch address.

8. The method of claim 7, wherein the instruction is fetched from a user mode program.

9. The method of claim 1, wherein the instruction requires the processor to be in supervisor mode for execution.

10. The method of claim 1, wherein the instruction mask register contains zeros in each bit position of a given operand within an instruction.

11. The method of claim 1, wherein the predetermined instruction is an opcode for which the processor will be put in supervisor mode.

12. The method of claim 2, wherein the instruction mask register contains zeros in one or more bit positions where the instruction may have a range of values.

13. The method of claim 1, wherein the processor privilege is raised to the supervisor mode to execute the instruction without throwing a privilege exception.

14. The method of claim 1, wherein the processor is a central processing unit.

15. A processor, comprising:
- a fetch module having a lower address register and an upper address register;
- a first comparison circuit to determine that a fetch address is greater than the content of the lower address register;
- a second comparison circuit to determine that a fetch address is less than the content of the upper address register;
- a first AND gate having a first input coupled to the output of the first comparison circuit and a second input coupled to the output of the second comparison circuit;
- an instruction mask register containing an instruction mask;
- a bitwise logical AND circuit having a first input receiving an instruction from the fetch address and a second input receiving the instruction mask;
- an instruction value compare register;
- a third comparison circuit to determine whether the filtered instruction equals the value compare register after being filtered through the instruction mask; and
- a second AND gate having a first input coupled to an output of the first AND gate, a second input coupled to the output of the third comparison circuit, and an output that, if true, raises the privilege of the processor for execution of the instruction;
- wherein the content of the instruction value compare register and the content of the instruction mask register may be set only in supervisor mode.

16. The processor of claim 15, wherein the processor privilege is reduced for a subsequent instruction unless the output of the second AND gate is again true.

17. The processor of claim 15, wherein the processor is a central processing unit.

* * * * *